United States Patent
Chiu

(10) Patent No.: US 8,860,351 B2
(45) Date of Patent: Oct. 14, 2014

(54) FAN SPEED CONTROL CIRCUIT

(71) Applicant: Hsien-Chang Chiu, New Taipei (TW)

(72) Inventor: Hsien-Chang Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 86 days.

(21) Appl. No.: 13/676,272

(22) Filed: Nov. 14, 2012

(65) Prior Publication Data

US 2014/0070749 A1    Mar. 13, 2014

(30) Foreign Application Priority Data

Sep. 11, 2012    (TW) .................................. 101133208

(51) Int. Cl.
*H02P 7/06*   (2006.01)
*G05D 23/20*   (2006.01)
*G05D 23/19*   (2006.01)

(52) U.S. Cl.
CPC *G05D 23/20* (2013.01); *H02P 7/06* (2013.01); *G05D 23/1919* (2013.01); *G06G 1/206* (2013.01)
USPC ............................ 318/471; 318/456; 318/461

(58) Field of Classification Search
CPC ....... H02P 7/06; H02P 7/2885; H02P 7/2913; H02P 29/0044; H02P 7/28; G05D 23/20
USPC .......... 318/447, 456, 458, 461, 463, 471–473
See application file for complete search history.

(56) References Cited

U.S. PATENT DOCUMENTS

| | | | | |
|---|---|---|---|---|
| 6,188,189 B1 * | 2/2001 | Blake | | 318/471 |
| 7,205,733 B2 * | 4/2007 | Xiong et al. | | 318/400.11 |
| 7,425,809 B2 * | 9/2008 | Shen et al. | | 318/471 |
| 7,598,690 B2 * | 10/2009 | Yang et al. | | 318/254.1 |
| 7,826,722 B2 * | 11/2010 | Lin et al. | | 388/811 |

FOREIGN PATENT DOCUMENTS

| | | |
|---|---|---|
| CN | 102654131 | 9/2012 |
| TW | 201021399 | 6/2010 |
| TW | M404279 | 5/2011 |
| TW | 201215305 | 4/2012 |

* cited by examiner

*Primary Examiner* — Bentsu Ro
(74) *Attorney, Agent, or Firm* — Novak Druce Connolly Bove + Quigg LLP

(57) ABSTRACT

A fan speed control circuit is provided. The circuit includes a sensor, a control chip, a first integrated circuit, an integrated operational amplifier, a second integrated circuit, and a feedback comparator. The sensor senses a temperature of an electronic component. The control chip outputs a PWM signal corresponding to the temperature to a fan. The first integrated circuit and the second integrated circuit respectively generate a first equivalent voltage and a second equivalent voltage. The integrated operational amplifier amplifies the first equivalent voltage to generate an upper limit voltage and reduces the first equivalent voltage to generate a lower limit voltage. The feedback comparator compares the second equivalent voltage with the upper limit voltage and the lower limit voltage to generate a comparison value. The control chip adjusts the duty cycle of the PWM signal according to the comparison value, and outputs the adjusted PWM signal to the fan.

13 Claims, 6 Drawing Sheets

FAN SPEED CONTROL CIRCUIT

BACKGROUND

1. Technical Field

The present disclosure relates to fan speed control circuits and, more particularly, to a fan speed control circuit capable of regulating the rotation speed of a fan according to feedback from the fan.

2. Description of Related Art

During operation of electronic devices, for example computers, some electronic components, for example CPUs, may generate a lot of heat. Fans in the electronic devices are employed to dissipate heat. Usually, one fan is to dissipate the heat generated by one electronic component. Thus, a number of fans may be mounted in the electronic device to dissipate heat efficiently. Usually, the electronic device employs a number of thermal sensors to detect the temperature of the electronic components. Each sensor is used to detect the temperature of one electronic component. The electronic device generates a PWM signal containing a unique duty cycle corresponding to the detected temperature of one sensor and outputs the PWM signal to the fan monitored by the sensor to control the fan to rotate with a rotation speed. However, depending on the type, manufacturer, and usage time of the fan, the rotation speed may not reach a preset rotation speed when the same PWM signals are sent to the aforementioned fans. Thus, the heat emitted by some electronic components may not be dissipated efficiently, which may cause the electronic device to be burned up. Therefore, it is desired to provide a fan speed control circuit to resolve the above problem.

BRIEF DESCRIPTION OF THE DRAWINGS

The components in the drawings are not necessarily drawn to scale, the emphasis instead being placed upon clearly illustrating the principles of the fan speed control circuit. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
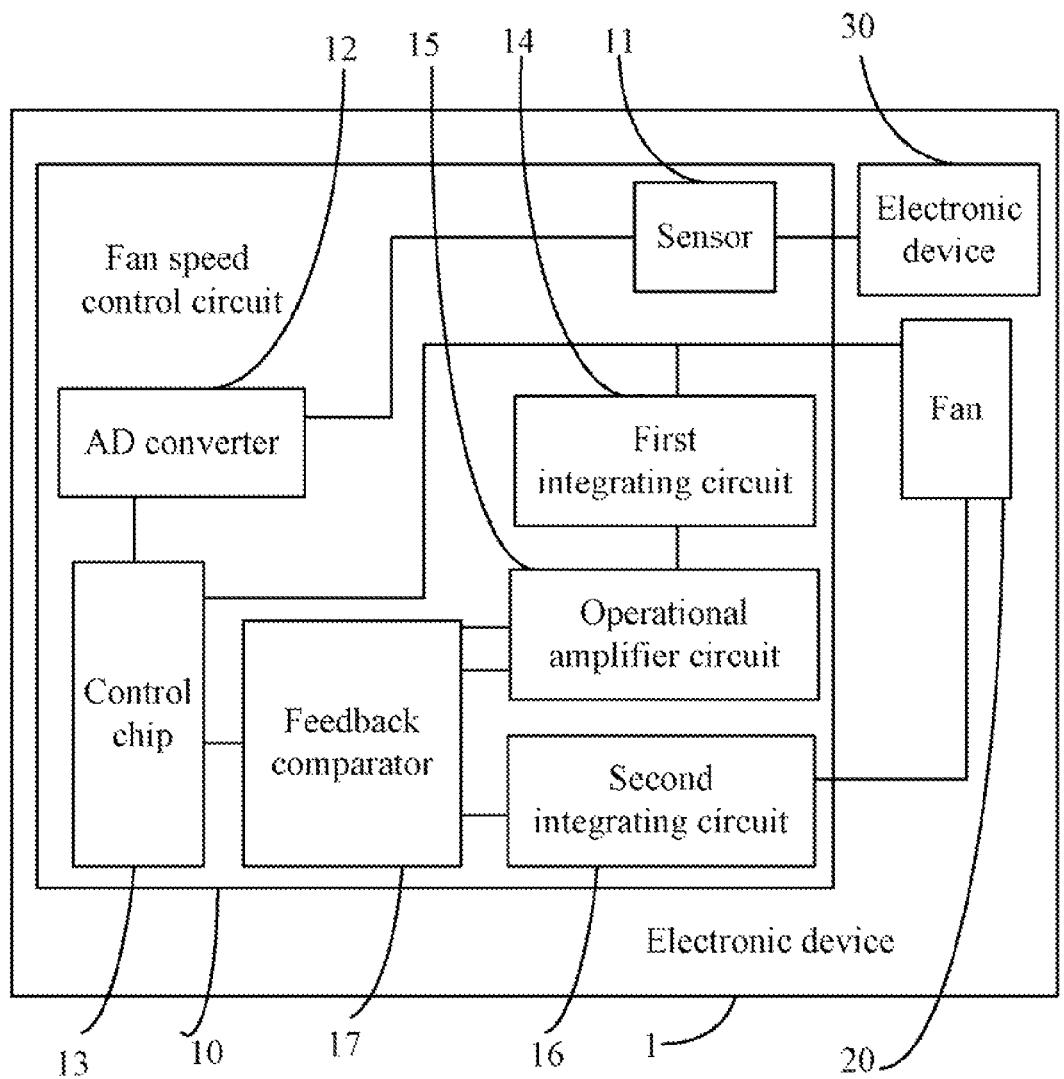
FIG. 1 is one embodiment of a block diagram of a fan speed control circuit.

FIG. 1 shows one embodiment of a fan speed control circuit 10. The fan speed control circuit 10 is applied in an electronic device 1. The electronic device 1 includes at least one fan 20 and at least one electronic component 30. Each fan 20 corresponds to one electronic component 30 and is used to dissipate the heat of the corresponding electronic component 30. Each fan speed control circuit 10 corresponds to one fan and can regulate the rotation speed of the corresponding fan 20. In the following description, a fan speed control circuit 10 is employed to illustrate the principle of the present disclosure. The fan speed control circuit 10 includes a sensor 11, an AD converter 12, a control chip 13, a first integrated circuit 14, an integrated operational amplifier 15, a second integrated circuit 16, and a feedback comparator 17.

The sensor 11 is to sense temperature of the corresponding electronic component 30 and generate a corresponding temperature signal. The AD converter 12 is to convert the temperature signal into a digital signal. The control chip 13 is connected between the AD converter 12 and the fan 20. The control chip 13 is to generate a PWM signal containing a unique duty cycle corresponding to the digital signal, to control the fan 20 to dissipate the heat of the electronic component 30. The first integrated circuit 14 is connected to the control chip 13. The first integrated circuit 14 is to obtain the PWM signal output by the control chip 13, integrate and smooth the obtained PWM signal output by the control chip 13 to generate a first equivalent voltage. The integrated operational amplifier 15 is connected to the first integrated circuit 14. The integrated operational amplifier 15 is to amplify the first equivalent voltage to generate an upper limit voltage and reduce the first equivalent voltage to generate a lower limit voltage. When the equivalent voltage of the PWM signal output by the control chip 13 is between the upper limit voltage and the lower limit voltage, the fan 20 can efficiently dissipate the heat of the electronic component 30. Otherwise, the fan 20 can not efficiently dissipate the heat of the electronic component 30. The second integrated circuit 16 is connected to the fan 20. The second integrated circuit 16 is to obtain the PWM signal output by the fan 20, and integrate and smooth the obtained PWM signal output by the fan 20 to generate a second equivalent voltage. The feedback comparator 17 is connected to the integrated operational amplifier 15 and the second integrated circuit 16. The feedback comparator 17 is used to compare the second equivalent voltage with the upper limit voltage and the lower limit voltage to generate a comparison value to the control chip 13. The control chip 13 is further to adjust the duty cycle of the PWM signal corresponding to the digital signal according to the comparison value, and output the adjusted PWM signal to the fan 20 to regulate the rotation speed of the fan 20. If the second equivalent voltage is less than the lower limit voltage, the control chip 13 increases the duty cycle of the PWM signal corresponding to the digital signal to increase the rotation speed of the fan 20. If the second equivalent voltage is greater than the upper limit voltage, the control chip 13 decreases the duty cycle of the PWM signal corresponding to the digital signal to decrease the rotation speed of the fan 20.

Figure 2:
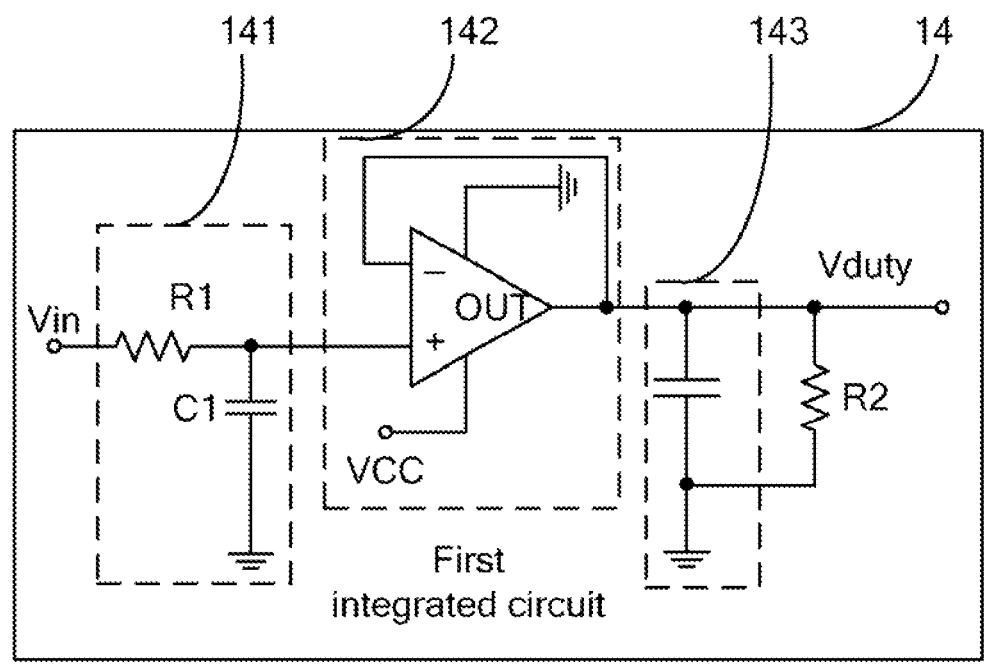
FIG. 2 is a circuit diagram of a first integrated circuit of the fan speed control circuit of FIG. 1.

FIG. 2 shows the first integrated circuit 14 of the embodiment. The first integrated circuit 14 includes a first RC circuit 141, a first voltage follower 142, and a first stable capacitor 143. The first RC circuit 141 is connected to the control chip 13. The first RC circuit 141 obtains the PWM signal output by the control chip 13, integrates a highly peaked square wave of the obtained PWM signal output by the control chip 13, and transforms the integrated highly peaked square wave of the obtained PWM signal output by the control chip 13 into a first saw-tooth wave voltage. The ratio of the duration of the highly peaked square wave of the PWM signal to the total period of the PWM signal is equal to the duty cycle of the PWM signal. The first voltage follower 142 is connected between the first RC circuit 141 and the first stable capacitor 143. The first voltage follower 142 transfers the first saw-tooth wave voltage from the first RC circuit 141 to the first stable capacitor 143 to charge the first stable capacitor 143. The first stable capacitor 143 stably outputs the first equivalent voltage when the capacitor 143 has been fully charged. In this embodiment, the first equivalent voltage is represented by Vduty. The first RC circuit 141 includes a resistor R1 and a capacitor C1. One end of the resistor R1 is connected to the control chip 13, and the other end of the resistor R1 is grounded through the capacitor C1 and directly connected to the first voltage follower 142. The first voltage follower 142 includes a non-inverting input, an inverting input, and an output. The non-inverting input of the first voltage follower 142 is connected to the resistor R1 and the capacitor C1, the inverting input of the first voltage follower 142 is connected to the output of the first voltage follower 142. One end of the first stable capacitor 143 is connected to the first voltage follower 142 and the integrated operational amplifier 15, and the other end of the first stable capacitor 143 is grounded.

Figure 3:
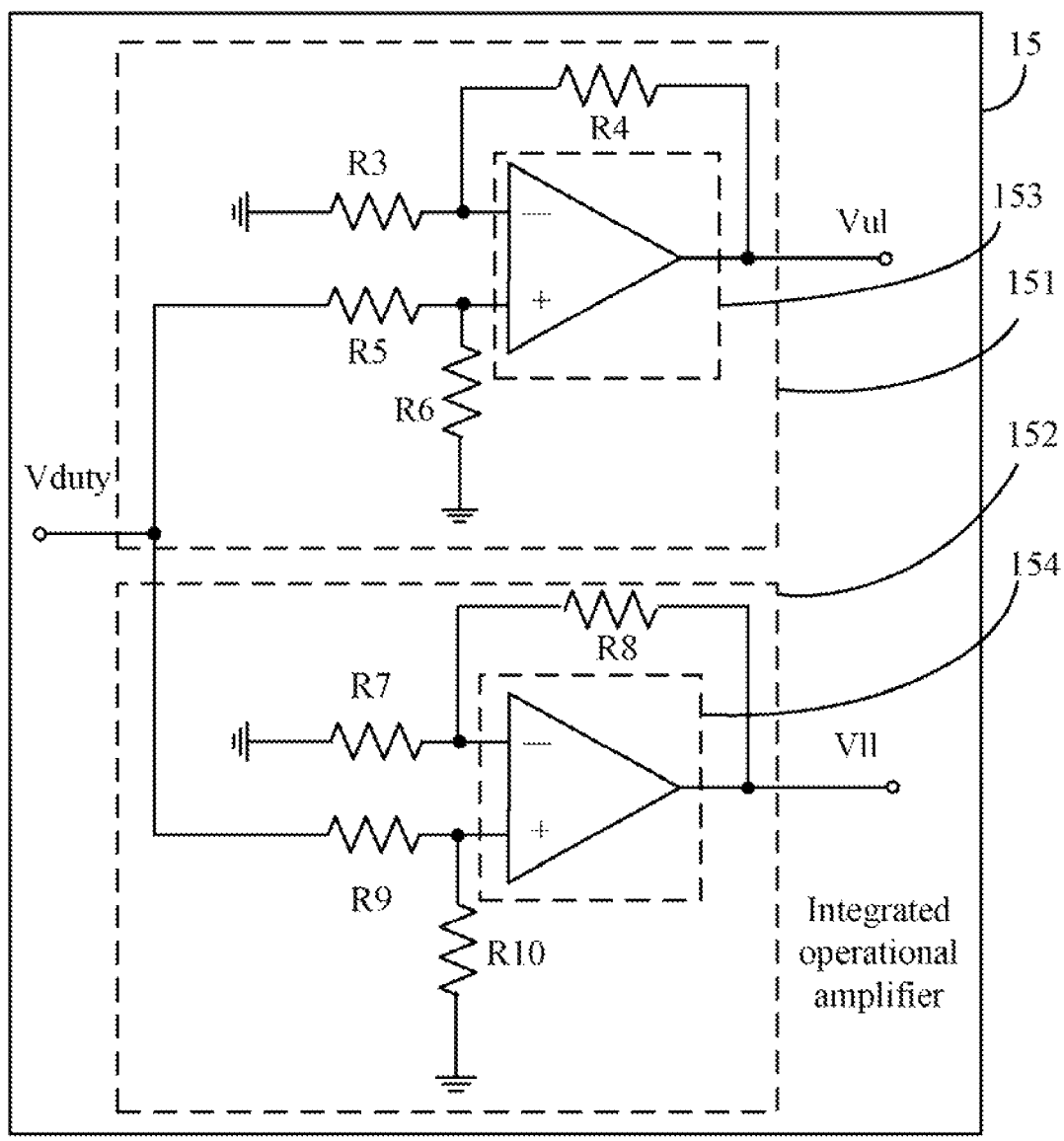
FIG. 3 is a circuit diagram of an integrated operational amplifier of the fan speed control circuit of FIG. 1.

FIG. 3 shows the integrated operational amplifier 15 of the embodiment. The integrated operational amplifier 15 includes a first integrated operational amplifier 151 and a second integrated operational amplifier 152. The first integrated operational amplifier 151 is connected to the first integrated circuit 14 to amplify the first equivalent voltage to generate the upper limit voltage. The second integrated operational amplifier 152 is connected to the first integrated circuit 14 to reduce the first equivalent voltage to generate the lower limit voltage. In this embodiment, the upper limit voltage is represented by Vul, and the lower limit voltage is represented by Vll. The first integrated operational amplifier 151 includes a first operational amplifier 153, a resistor R3, a resistor R4, a resistor R5, and a resistor R6. The first operational amplifier 153 includes an inverting input, a non-inverting input, and an output. The inverting input of the first operational amplifier 153 is grounded through the resistor R3 and connected to the output of the first operational amplifier 153 through the resistor R4. The non-inverting input of the first operational amplifier 153 is connected to the first stable capacitor 143 and the first voltage follower 142 through the resistor R5, and grounded through the resistor R6. The output of the first operational amplifier 153 is connected to the feedback comparator 17 to output the upper limit voltage $$Vul = \left(1 + \frac{R4}{R3}\right)\left(\frac{R6}{R5 + R6}\right) \times Vduty$$

to the feedback comparator 17.

The second integrated operational amplifier 152 includes a second operational amplifier 154, a resistor R7, a resistor R8, a resistor R9, and a resistor R10. The second operational amplifier 154 includes an inverting input, a non-inverting input, and an output. The inverting input of the second operational amplifier 154 is grounded through the resistor R7, and is connected to the output of the second operational amplifier 154 through the resistor R8. The non-inverting input of the second operational amplifier 154 is connected to the first stable capacitor 143 and the first voltage follower 142 through the resistor R9, and grounded through the resistor R10. The output of the second operational amplifier 154 is connected to the feedback comparator 17 to output the lower limit voltage $$Vll = \left(1 + \frac{R8}{R7}\right)\left(\frac{R10}{R9 + R10}\right) \times Vduty$$

to the feedback comparator 17.

Figure 4:
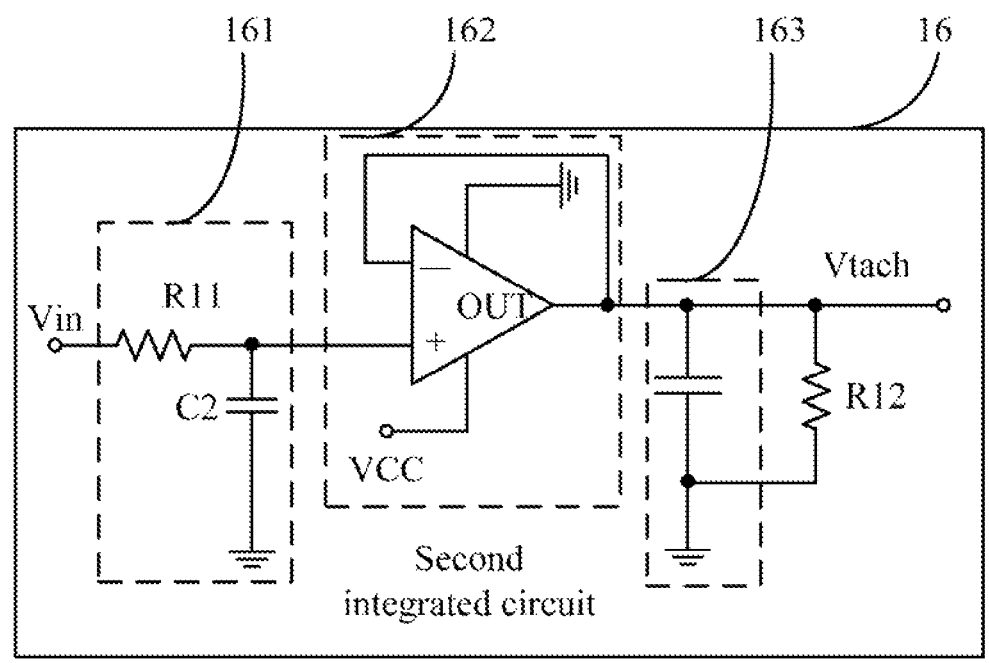
FIG. 4 is a circuit diagram of a second integrated circuit of the fan speed control circuit of FIG. 1.

Referring to FIG. 4, the second integrated circuit 16 includes a second RC circuit 161, a second voltage follower 162, and a second stable capacitor 163. The second RC circuit 161 is connected to the fan 20. The second RC circuit 161 obtains the PWM signal output by the fan 20, integrates the highly peaked square wave of the obtained PWM signal output by the fan 20, and transforms the integrated highly peaked square wave of the obtained PWM signal output by the fan 20 into a second saw-tooth wave voltage. The second voltage follower 162 transfers the second saw-tooth wave voltage from the second RC circuit 161 to the second stable capacitor 163 to charge the second stable capacitor 163. The second stable capacitor 163 stably outputs the second equivalent voltage when the second stable capacitor 163 has been charged completely. In this embodiment, the second equivalent voltage is represented by Vtach. The second RC circuit 161 includes a resistor R11 and a capacitor C2. One end of the resistor R11 is connected to the fan 20, and the other end of the resistor R11 is directly connected to the second voltage follower 162 and grounded through the capacitor C2. The second voltage follower 162 includes a non-inverting input, an inverting input, and an output. The non-inverting input of the second voltage follower 162 is connected to the resistor R11 and the capacitor C2, the inverting input of the second voltage follower 162 is connected to the output of the second voltage follower 162. One end of the second stable capacitor 163 is connected to the second voltage follower 162 and the feedback comparator 17, and the other end of the second stable capacitor 163 is grounded.

Figure 5:
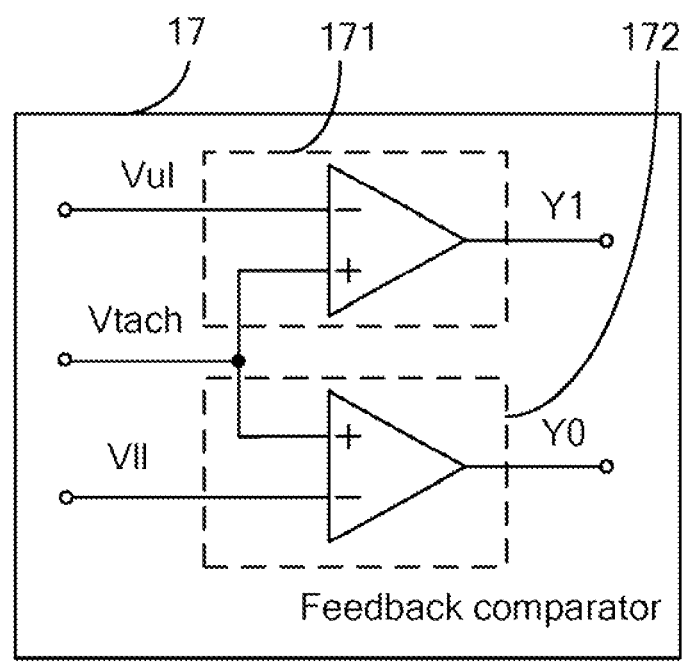
FIG. 5 is a circuit diagram of a feedback comparator of the fan speed control circuit of FIG. 1.

Referring to FIG. 5, the feedback comparator 17 includes a first comparator 171 and a second comparator 172. The first comparator 171 includes an inverting input, a non-inverting input, and an output. The inverting input of the first comparator 171 is connected to the output of the first operational amplifier 153. The non-inverting input of the first comparator 171 is connected to the second stable capacitor 163 and the second voltage follower 162. The output of the first comparator 171 is connected to the control chip 13. The first comparator 171 is to compare the second equivalent voltage Vtach with the upper limit voltage Vul to generate a first result. In this embodiment, the first result is represented by Y1. When the second equivalent voltage Vtach is greater than the upper limit voltage Vul, the first result Y1 is set as 1. Otherwise, the first result Y1 is set as 0. The second comparator 172 includes an inverting input, a non-inverting input, and an output. The inverting input of the second comparator 172 is connected to the output of the second operational amplifier 154. The non-inverting input of the second comparator 172 is connected to the second stable capacitor 163 and the second voltage follower 162. The output of the second comparator 172 is connected to the control chip 13. The second comparator 172 is to compare the second equivalent voltage Vtach with the lower limit voltage Vll to generate a second result. In the embodiment, the second result is represented by Y0. When the second equivalent voltage Vtach is greater than the lower limit voltage Vll, the second result Y0 is set as 1. Otherwise, the second result Y0 is set as 0. The comparison value is formulated by the first result Y1 and the second result Y0.

Figure 6:
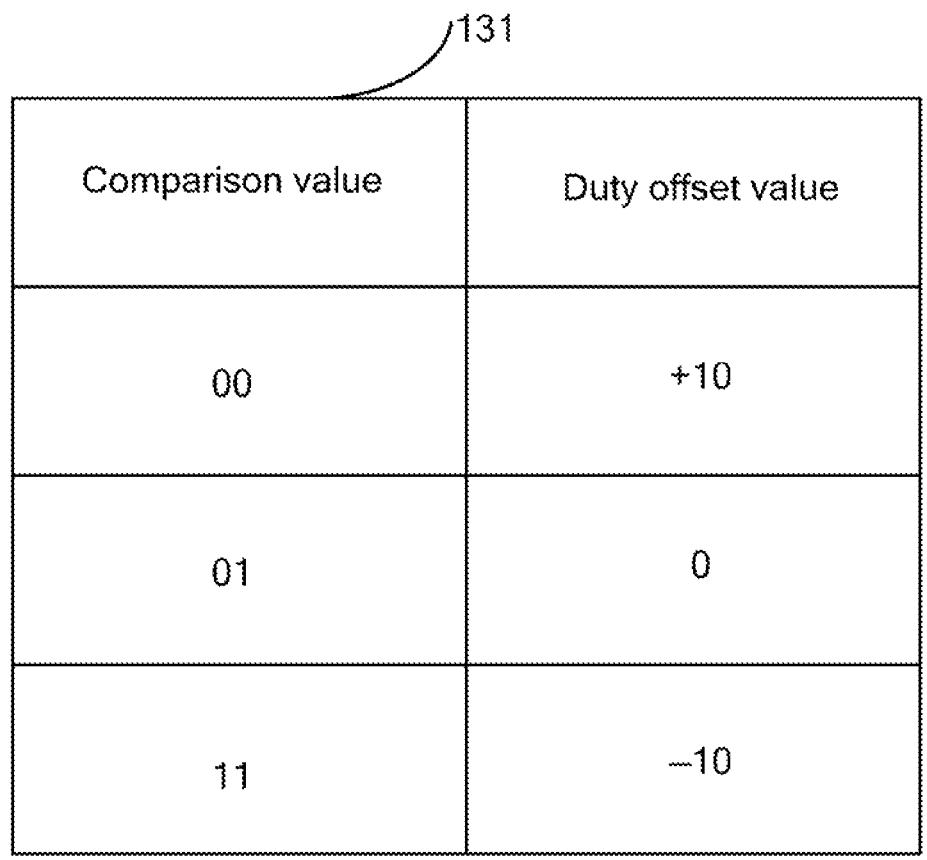
FIG. 6 is a schematic view illustrating one embodiment of a duty cycle offset table.

FIG. 6 shows the control chip 13 of the embodiment. The control chip 13 stores a duty cycle offset table 131. The duty cycle offset table 131 can be default or edited by the user. The duty cycle offset table 131 records a number of comparison values and a number of duty cycle offset values. Each comparison value corresponds to one duty cycle offset value. The control chip 13 determines the duty cycle offset value corresponding to the comparison value output by the feedback comparator 17 according to the duty cycle offset table 131, adds the determined duty cycle offset value to the determined duty cycle of the PWM signal corresponding to the digital signal to determine a total duty cycle, and outputs a PWM signal containing the determined total duty cycle to the fan 20 to regulate the rotation speed of the fan 20.

With this configuration, if the rotation speed of fan 20 cannot reach a preset rotation speed when a PWM signal containing an unique duty cycle is output to the fan 20, the control chip 13 can adjust the duty cycle of the PWM signal according to the feedback of the fan 20 and output the adjusted duty cycle of the PWM signal to the fan 20 to regulate the rotation speed of the fan 20. Thus, the fan 20 can efficiently dissipate the heat emitted by the corresponding electronic component 30.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A fan speed control circuit applied in an electronic device to control the rotation speed of a fan of the electronic device, the fan speed control circuit comprising:
    a sensor to sense a temperature of an electronic component which heat is dissipated by the fan and generate a corresponding temperature signal;
    an AD converter to convert the temperature signal into a digital signal;
    a control chip connected between the AD converter and the electronic component, the control chip outputting a PWM signal containing a unique duty cycle corresponding to the digital signal to the fan to control the rotation speed of the fan;
    a first integrated circuit connected to the control chip, the first integrated circuit obtaining the PWM signal output by the control chip, and integrating and smoothing the obtained PWM signal output by the control chip to generate a first equivalent voltage;
    an integrated operational amplifier connected to the first integrated circuit, the integrated operational amplifier amplifying the first equivalent voltage to generate an upper limit voltage and reducing the first equivalent voltage to generate a lower limit voltage;
    a second integrated circuit connected to the fan, the second integrated circuit obtaining the PWM signal output by the fan, integrating and smoothing the obtained PWM signal output by the fan to generate a second equivalent voltage; and
    a feedback comparator connected to the integrated operational amplifier and the second integrated circuit, the feedback comparator comparing the second equivalent voltage with the upper limit voltage and the lower limit voltage to generate a comparison value to the control chip;
    wherein the control chip adjusts the duty cycle of the PWM signal corresponding to the digital signal according to the comparison value, and outputs the adjusted PWM signal to the fan to regulate the rotation speed of the fan.

2. The fan speed control circuit as described in claim 1, wherein the first integrated circuit comprises a first RC circuit connected to the control chip, a first voltage follower, and a first stable capacitor; the first RC circuit obtains the PWM signal output by the control chip, integrates the highly peaked square wave of the obtained PWM signal output by the control chip, and transforms the integrated highly peaked square wave of the obtained PWM signal output by the control chip into a first saw-tooth wave voltage; the ratio of the duration of the highly peaked square wave of the PWM signal to the total period of the PWM signal is equal to the duty cycle of the PWM signal; the first voltage follower is connected between the first RC circuit and the first stable capacitor; the first voltage follower transfers the first saw-tooth wave voltage from the first RC circuit to the first stable capacitor to charge the first stable capacitor; the first stable capacitor stably outputs the first equivalent voltage when the capacitor has been charged completely.

3. The fan speed control circuit as described in claim 2, wherein the first RC circuit comprises a resistor and a capacitor; one end of the resistor R1 is connected to the control chip, and another end of the resistor is grounded through the capacitor and connected to the first voltage follower.

4. The fan speed control circuit as described in claim 2, wherein one end of the first stable capacitor is connected to the first voltage follower and the integrated operational amplifier, and another end of the first stable capacitor is grounded.

5. The fan speed control circuit as described in claim 1, wherein the second integrated circuit comprises a second RC circuit, a second voltage follower, and a second stable capacitor, the second RC circuit is connected to the fan; the second RC circuit obtains the PWM signal output by the fan, integrates the highly peaked square wave of the obtained PWM signal output by the fan, and transforms the integrated highly peaked square wave of the obtained PWM signal output by the fan into a second saw-tooth wave voltage; the ratio of the duration of the highly peaked square wave of the PWM signal to the total period of the PWM signal is equal to the duty cycle of the PWM signal; the second voltage follower transfers the second saw-tooth wave voltage from the second RC circuit to the second stable capacitor to charge the second stable capacitor; the second stable capacitor stably outputs the second equivalent voltage when the second stable capacitor has been charged completely.

6. The fan speed control circuit as described in claim 5, wherein the second RC circuit comprises a resistor and a capacitor, one end of the resistor is connected to the fan, and the other end of the resistor is grounded through the capacitor and connected to the second voltage follower.

7. The fan speed control circuit as described in claim 5, wherein one end of the second stable capacitor is connected to the second voltage follower and the feedback comparator, and another end of the second stable capacitor is grounded.

8. The fan speed control circuit as described in claim 1, wherein the integrated operational amplifier comprises a first integrated operational amplifier and a second integrated operational amplifier, the first integrated operational amplifier is connected to the first integrated circuit to amplify the first equivalent voltage to generate the upper limit voltage, the second integrated operational amplifier is connected to the first integrated circuit to reduce the first equivalent voltage to generate the lower limit voltage.

9. The fan speed control circuit as described in claim 8, wherein the first integrated operational amplifier comprises a first operational amplifier, a first resistor, a second resistor, a third resistor, and a fourth resistor; the first operational amplifier comprises an inverting input, a non-inverting input, and an output; the inverting input of the first operational amplifier is grounded through the first resistor and connected to the output of the first operational amplifier through the second resistor; the non-inverting input of the first operational amplifier is connected to the first integrated circuit through the third resistor, and is grounded through the fourth resistor; the output of the first operational amplifier is connected to the feedback comparator.

10. The fan speed control circuit as described in claim 8, wherein the second integrated operational amplifier comprises a second operational amplifier, a fifth resistor, a sixth resistor, a seventh resistor, and an eighth resistor; the second operational amplifier comprises an inverting input, a non-inverting input, and an output; the inverting input of the second operational amplifier is grounded through the fifth resistor and connected to the output of the second operational amplifier through the sixth resistor; the non-inverting input of the second operational amplifier is connected to the first integrated circuit through the seventh resistor, and is grounded through the eighth resistor; the output of the second operational amplifier is connected to the feedback comparator.

11. The fan speed control circuit as described in claim 10, wherein the feedback comparator comprises a first comparator and a second comparator, the first comparator compares the second equivalent voltage with the upper limit voltage to generate a first result, the second comparator compares the second equivalent voltage with the lower limit voltage to generate a second result, the comparison value compares the first result and the second result.

12. The fan speed control circuit as described in claim 11, wherein the first comparator comprises an inverting input, a non-inverting input, and an output; the inverting input of the first comparator is connected to the output of the first operational amplifier, the non-inverting input of the first comparator is connected to the second integrated circuit, and the output of the first comparator is connected to the control chip; the second comparator comprises an inverting input, a non-inverting input, and an output; the inverting input of the second comparator is connected to the output of the second operational amplifier, the non-inverting input of the second comparator is connected to the second integrated circuit, and the output of the second comparator is connected to the control chip.

13. The fan speed control circuit as described in claim 12, wherein the control chip stores a duty cycle offset table recording a plurality of comparison values and a plurality of duty cycle offset values; each of the comparison values corresponds to one of the duty cycle offset values; the control chip determines the duty cycle offset value corresponding to the comparison value output by the feedback comparator according to the duty cycle offset table, adds the determined duty cycle offset value to the determined duty cycle of the PWM signal corresponding to the digital signal to determine a total duty cycle, and outputs the PWM signal containing the determined total duty cycle to the fan to regulate the rotation speed of the fan.

* * * * *